Feb. 15, 1966 C. E. P. V. VAN DEN BERG ETAL 3,234,995
PROCESS FOR SEPARATING AN AMORPHOUS POLYMER
FROM A SOLUTION THEREOF
Filed March 27, 1962 2 Sheets-Sheet 1
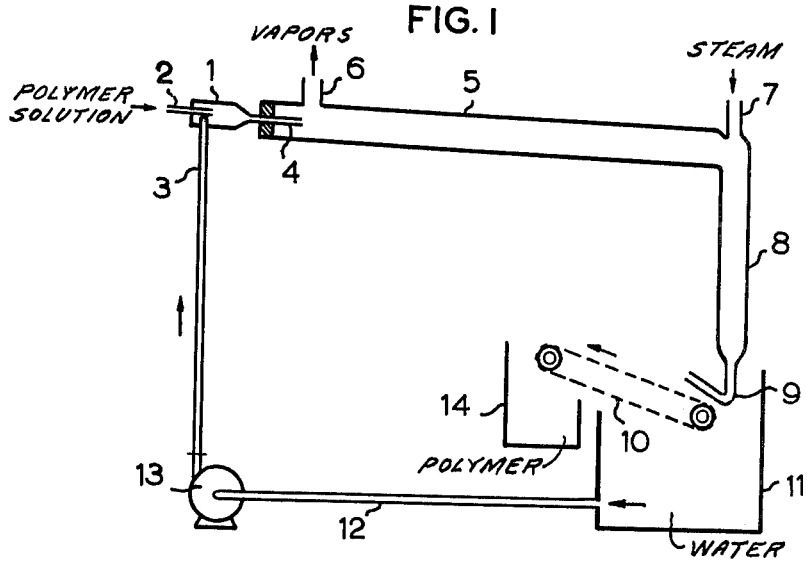
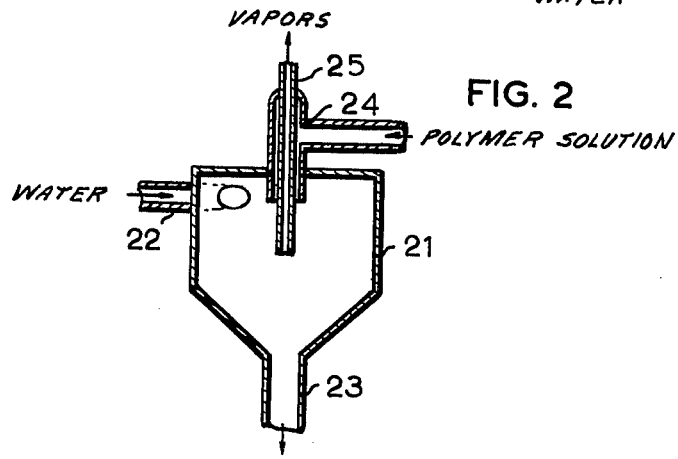
Inventors
CORNELIS E.P.V. VAN DEN BERG
GERARDUS J.A. SCHEERS
THEODORUS PULLES
By Tourover and Browdy
Attorneys Inventors
CORNELIS E.P.V. VAN DEN BERG
GERARDUS J.A. SCHEERS
THEODORUS PULLES By Tourover and Browdy
Attorneys United States Patent Office 3,234,995
Patented Feb. 15, 1966

3,234,995
PROCESS FOR SEPARATING AN AMORPHOUS POLYMER FROM A SOLUTION THEREOF
Cornelis E. P. V. van den Berg and Gerardus J. A. Scheers, Geleen, and Theodorus Pulles, Beek, Netherlands, assignors to Stamicarbon N.V., Heerlen, Netherlands
Filed Mar. 27, 1962, Ser. No. 182,871
Claims priority, application Netherlands, Mar. 30, 1961, 263,131
3 Claims. (Cl. 159—47)

The present invention relates to a process for separating an amorphous polymer from a solution thereof. More particularly, the process relates to bringing the solution into contact with water having such a temperature and being subjected to such a pressure that the solvent evaporates, after which the polymer is separated from the water.

By amorphous polymer, it is to be understood that a completely or largely amorphous substance is meant which upon evaporation from the dissolved state shows a tendency to form glutinuos sheets, such as polyisoprene, polybutadiene, polyisobutene, styrene-butadiene copolymers, etc., or mixtures thereof and which, if desired, may be halogenated or modified in another way. The solutions obtained in practice usually contain 3 to 30 percent by weight of the polymer concerned. The invention in particular relates to the recovery of copolymers of ethylene with propene or butene-1 and/or a diolefin.

The German patent specification 732,514 (see especially page 3, column 2, lines 102 to 108) discloses the recovery of a polymer from a solution thereof by bringing the solution into contact with water having such a temperature and being subjected to such a pressure that the solvent evaporates. In that case, a suspension of the polymer in hot water is obtained. This is also described in the Dutch patent application 183,373 (see column 2, lines 35–38 and column 6, line 71 to column 7, line 6).

In addition, several variations of this process have been described, such as the use of surface-active substances (see especially the French patent specification 1,186,962, paragraph 4, and the Belgian patent specification 558,227, page 20), admitting the polymer solution as an aqueous emulsion into the evaporation zone (see especially the French patent specification 1,206,175, Summary B1, and the Belgian patent specification 557,454, Claim 6), introducing the polymer solution into the evaporation zone via an atomizer (see especially the French patent specification 1,206,175, page 3, paragraphs 2 and 3), and adding a dissolved alkaline substance in the evaporation zone (see especially the French patent specification 1,206,175, Summary A1). Another known procedure (see the Belgian patent specification 558,227, especially FIGURE 6) is first to atomize the solution into a conical compartment, the wall of which is kept wet by introducing a tangential flow of comparatively cold water into this compartment. Atomizing is done at a gas pressure at which evaporation does not take place yet. After that, the dispersion issuing from the apex of the conical compartment enters the evaporation zone proper. One of the drawbacks of this process is that the atomizer to be used is liable to clog up.

Various drawbacks have been found in these processes. It has been found by applicants that although execution of the above-mentioned processes in one or more stages and the use of surface-active substances such as fatty acids, salts of fatty acids, octyl alcohol, dodecylbenzyl-dimethylammoniumchloride, sorbitol monolaurate, synthetic soaps, "Lissapol" (trademark) carboxylmethyl cellulose, glycerolmonostearate, "Kolophonium" (trademark), "Tensophen," "Ultra Wet DS" (trademark) and/or "Dermaceen NP 7710" (trade-mark), combined, if desired, with anti-foaming agents, yield polymer crumbs suspended in water, the evaporation of the solvent and the simultaneous formation of polymer crumbs proceeds in an uncontrolled way. As a result, in the large-scale operation of the process, conglomerates of polymer crumbs are formed, which stick to the stirrer or float to the surface. Moreover, the use of surface-active substances is rather costly and in most cases undesired, as these substances may have an adverse effect on the properties of the product after vulcanization.

An object of the present invention is to provide a process in which the evaporation of the solvent takes place in a more controlled way.

A further object of the invention is to provide a process in which the use of surface-active substances is unnecessary.

Another object of the invention is to provide a process which does not necessarily lead to the formation of polymer crumbs, but by which the elastomer can, if desired, also be obtained in the form of threads or sheets.

A still further object of the invention is to provide a process that can be carried out with a minimum of steam consumption.

Other advantages of the invention will be discussed hereafter.

The process according to the present invention recovers an amorphous polymer from a solution thereof by bringing the solution into contact with water having such a temperature and being subjected to such a pressure that the solvent evaporates, and by subsequently separating the polymer from the water, wherein the water and the solution are added to a rotation chamber which is maintained substantially full of water, the water being forced into the rotation chamber in such a direction and under such a pressure as will make it pass through said chamber in a rotatory fashion, the solution being admitted into the rotation chamber along or near the axis of the rotatory current.

The rotation chamber is preferably a rotation-symmetrical chamber provided with at least one or more tangentially directed feed pipes which are perpendicular to the chamber axis projected on planes containing the feed pipes and parallel to the axis and which chamber is provided with centrally arranged supply and discharge pipes. The rotation-symmetrical chamber may, for example, have the shape of a cone or a cylinder.

By preference, the rotation chamber is a cylinder confined between two planes perpendicular to the axis and provided with a tangential water feed pipe, the one end of the cylinder being shut off by a wall into which the feed pipe for the polymer solution enters, whereas the other end connects to a conical part, the apex of which connects to a central outlet.

If a glass rotation chamber is used the polymer solution can often be seen to flow through the core of the rotatory current towards the outlet. The solvent vapor formed gathers in the core of the rotatory current. In consequence of this, the jet of polymer solution supplied quickly changes into an extremely thin-walled tube, as a result of which the solvent can quickly evaporate from the polymer. When the amount of evaporated solvent is very large, vapor bubbles are also observed on the outside of the polymer tube.

It is possible to discharge the vapor present in the polymer tube through the central outlet. To this end the polymer solution is introduced through the top of the rotation chamber via a feed pipe, while the vapor present around the axis of the cyclone flow, or at least part of it, is discharged upwardly through a tube coaxially fitted within the above-mentioned feed pipe.

However, the solvent vapor formed may also be discharged from the rotation chamber through the central discharge pipe together with the water and the completely or partly evaporated polymer solution.

The substances issuing from the rotation chamber through the central discharge pipe may in principle be treated in two ways. These substances may be passed on in such a way, for instance, through or over a water bath, so that the polymer tube will not break. This tube may then be rolled up or, for instance, be pressed to a sheet together with other tubes.

According to the other method, the substances issuing from the discharge pipe, and still having a rotary motion, are made to strike against a wall or against an amount of water in such a way that extremely thin polymer films are produced, from which film crumbs are formed. These crumbs are not liable to stick to a moistened, smooth wall and can be processed without any difficulty.

By preference, the process according to the invention is carried out in such a way that the substances flowing from the rotation chamber are introduced into the top of a tower, while steam is admitted into the tower at a lower point and a mixture of water vapor and solvent vapor is discharged from the top of the tower. Together with the water the polymer film streams down the wall of the tower and is thus further freed from solvent. This has the great advantage that the solvent can be evaporated with a minimum of steam consumption. For, whereas in the lower part of the tower a temperature of, for instance, 100° C. is maintained, with the result that the last traces of solvent are evaporated, it can be seen that a comparatively low temperature, for instance a few degrees above the boiling point of the solvent or of an azeotrope of the solvent with water, will prevail in the upper part of the tower; in consequence of which the vapor mixture issuing from the top of the tower will, owing to the comparatively low water vapor pressure, largely consist of solvent vapor.

The invention will be further explained with reference to the attached drawings, in which:

FIG. 1 is a diagrammatic view of an installation that can be used for carrying out the process of the present invention;

FIG. 2 is an enlarged view of a modified form of the rotation chamber; and,

Figure 3:
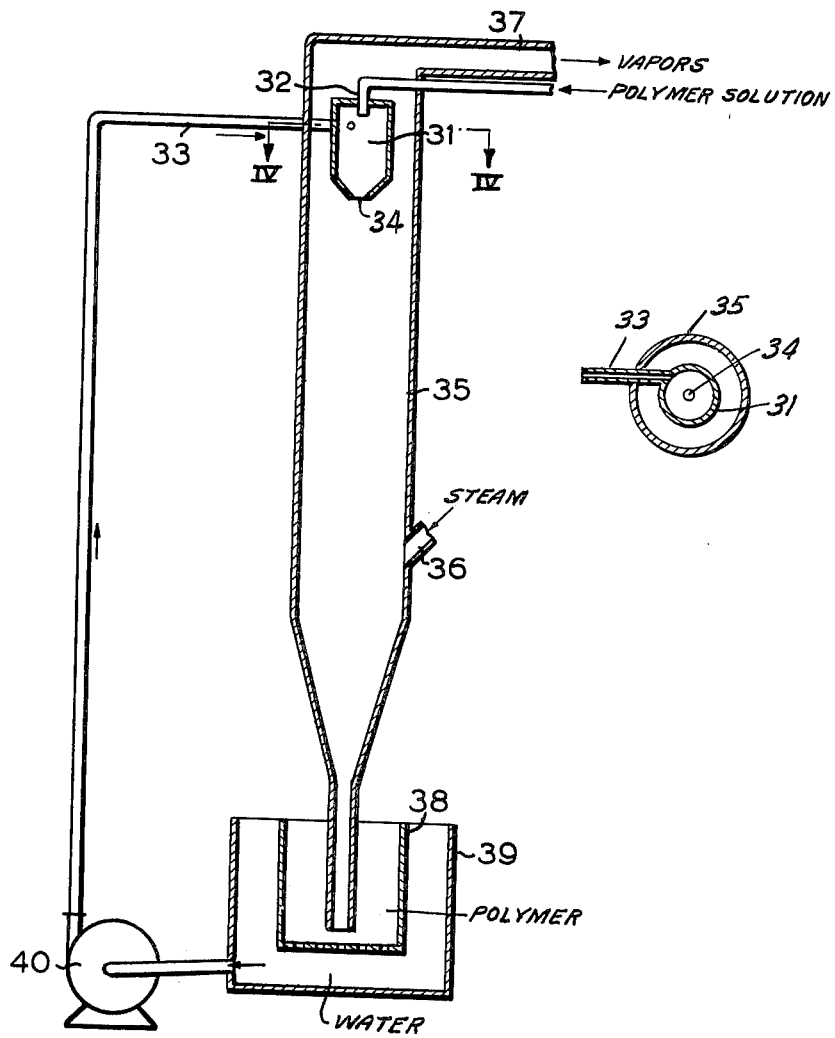
FIG. 3 is a diagrammatic view of a modified form of installation for carrying out the process of the present invention; and, FIG. 4 is a cross-sectional view along the line IV—IV of FIG. 3.

In FIGURE 1, the numeral 1 represents a rotation chamber which is maintained substantially full of a rotating solid body of liquid provided with a central supply pipe 2, through which the solution of polymer in, for instance, n-heptane can be fed into the rotation chamber. Through a supply pipe 3, discharging tangentially into the rotation chamber, hot water of, for instance, 75 to 100° C. can be supplied. The polymer solution, which has become largely evaporated of solvent and has assumed the shape of a very thin-walled tube in the rotation chamber then flows via the central discharge pipe 4 into the upper end of conduit 5, where the thin-walled tube, which has been broken off into small particles, is entrained by the water. Conduit 5 is provided with a vapor discharge pipe 6 near its upstream end, through which a mixture of solvent vapor and water vapor can be discharged, and with a supply pipe 7 near its downstream end through which steam can be supplied for expelling the last traces of solvent and also for transferring to the water circulating in the system the amount of heat consumed in the evaporation of the solvent. Through the vertical tube 8 and the curved end 9 of this tube, which acts as a water seal, the water and the polymer particles will drop onto screen conveyor 10. The tube 8 is not full of water as is the chamber 1. The greater portion of the water is collected in the reservoir 11 from which it is returned to conduit 3 via a conduit 12 and a pump 13. The wet polymer crumbs are collected in reservoir 14, after which they can be easily dried.

FIGURE 2 shows a rotation chamber 21 provided with a tangential water supply pipe 22, a central discharge pipe 23, a supply pipe 24 for the solution to be evaporated, and a discharge pipe 25, co-axially fitted within the said supply pipe through which the vapor gathering around the axis of the rotation chamber can be at least partially discharged immediately. This conduit 25 may, if desired, be extended beyond the outlet 23. The chamber 21 is maintained substantially full of a solid body of rotating liquid.

In FIGURE 3, 31 represents a rotation chamber maintained substantially full of a solid body of rotation liquid and provided with a supply pipe 32, through which the solution to be evaporated can be passed, a tangential water supply pipe 33 discharging into the rotation chamber, and a central discharge opening 34. The chamber is surrounded by a tower 35 in which the polymer tube is stretched into a broad, extremely thin film, which tears apart to form threadlike crumbly particles. The tower 35 is provided with a steam supply pipe 36 and a vapor discharge pipe 37. The polymer particles flowing from the tower 35 are delivered together with the water into the screen-bottom reservoir 38, in which the polymer crumbs are collected, whereas the water passing into the reservoir 39 is mixed with fresh water, if so desired, and can be returned to conduit 33 via pump 40.

Using the latter installation in combination with a rotation chamber of no more than 4.5 cm. in diameter and a tower of 3 m. in height, 2000 liters of an approximately 10 percent by weight solution of an ethylene-propene copolymer in n-heptane per day could be readily evaporated into particles which were completely free of solvent, or contained at least less than 1 percent by weight of solvents and could be processed without any difficulty.

As the temperature in the vapor discharge pipe 37 was only 70 to 75° C., steam consumption was very low (about 0.2 kg. of steam per liter of solution to be evaporated, only 0.05 kg. of steam of which solution distilled over). At no point did the polymer stick to a wall. This was because the critical stage in which the polymer may coagulate irregularly or stick to a wall, was passed very quickly.

Those skilled in the art can easily determine the optimum dimensions of the rotation chamber, which depend e.g. on the viscosity of the solution. Thus, in general, the diameter of the supply pipe 32 will have to be larger as the viscosity increases. The length of the cylindrical part of the rotation chamber will in general be 0.5 to 8 times the diameter of it.

The various ways of accomplishing the process according to the invention outlined above may be deviated from in many ways. For instance, if it is desired to make crumbs, one may pass the solution thoroughly mixed with water into the rotation chamber. Or, several rotation chambers instead of one can be fitted into the top of the tower 35 shown in FIGURE 3 and connected in parallel. As has been mentioned above, the thin-walled tube formed in the rotation chamber, may be passed on in such a way as to prevent it from breaking. Furthermore, in the preparation of elastomer crumbs the substances issuing from the rotation chamber can be processed in many ways; the resulting aqueous polymer dispersion may, for instance, be thickened by means of a cyclone. It is also possible to add surface-active substances, but one of the attractive advantages of the process according to the present invention is that this can be omitted.

We claim:

1. A process for separating an amorphous polymer from a solution thereof comprising bringing the solution into contact with a solid rotating body of hot water in a rotation chamber, said water substantially filling said chamber and being forced thereinto in a direction and under a pressure so that it passes through the chamber in a rotatory current having an axis of rotation at the center of said chamber, said solution being both admitted into the rotation chamber and being withdrawn therefrom at opposite ends thereof at approximately the axis of the rotatory current whereby said polymer follows substantially along the axis of the rotatory current on passing through said chamber, the temperature of said water being such as to evaporate the solvent from said solution, continuously discharging the contents of said chamber from said chamber and separating the polymer, the water and the vapors of the solvent from each other.

2. A process in accordance with claim 1 wherein the contents discharged from the chamber are admitted into the upper end of a tower, steam is admitted into the tower near the lower end thereof, vapors formed in said tower are discharged near the upper end of said tower, and the polymer and the liquid water are discharged at the lower end of said tower.

3. A process in accordance with claim 2 wherein said material discharged from said tower is separated into polymer and water, and the water is recycled to said chamber.

References Cited by the Examiner

UNITED STATES PATENTS

| | | | |
|---|---|---|---|
| 2,098,608 | 11/1937 | Berges | 210—512 |
| 2,366,460 | 1/1945 | Semon | 260—94.7 X |
| 2,378,732 | 6/1945 | Semon et al. | 260—94.7 X |
| 2,561,256 | 7/1951 | Wilson et al. | 260—95 X |
| 2,974,131 | 3/1961 | McLeod | 260—96 X |
| 3,003,347 | 10/1961 | Morris et al. | |

FOREIGN PATENTS 1,227,539   8/1960   France.

NORMAN YUDKOFF, *Primary Examiner.*

GEORGE D. MITCHELL, *Examiner.*